United States Patent

Ingeberg

[11] Patent Number: 4,758,124
[45] Date of Patent: Jul. 19, 1988

[54] ARRANGEMENT RELATING TO A NUT FOR LOCATION IN AN OPEN CHANNEL SECTION

[76] Inventor: Bjorn Ingeberg, Skigardveien 14, Oslo, Norway

[21] Appl. No.: 52,040
[22] PCT Filed: Oct. 8, 1986
[86] PCT No.: PCT/NO86/00071
 § 371 Date: Mar. 4, 1987
 § 102(e) Date: Mar. 4, 1987
[87] PCT Pub. No.: WO87/02431
 PCT Pub. Date: Apr. 23, 1987

[30] Foreign Application Priority Data

Oct. 8, 1985 [NO] Norway .................................. 853993

[51] Int. Cl.⁴ ............................................. F16B 27/00
[52] U.S. Cl. .................................... 411/85; 411/112; 411/970
[58] Field of Search ............... 411/123, 124, 112, 116, 411/174, 175, 84, 85, 352, 432, 427, 970, 999; 403/230, 252

[56] References Cited

U.S. PATENT DOCUMENTS

| | | | |
|---|---|---|---|
| 2,767,951 | 10/1956 | Cousino | 411/970 |
| 2,772,560 | 12/1956 | Neptune | 411/427 |
| 3,049,369 | 8/1962 | Trafton | 411/970 |
| 3,483,910 | 12/1969 | La Londe et al. | 411/112 |
| 3,680,620 | 8/1972 | Gotschel et al. | 411/970 |
| 4,021,129 | 5/1977 | Sykes | 403/252 |
| 4,146,074 | 3/1979 | Kowalski | 411/970 |
| 4,263,952 | 4/1981 | Kowalski | 411/112 |

FOREIGN PATENT DOCUMENTS

| | | | |
|---|---|---|---|
| 1020471 | 2/1966 | United Kingdom | 411/85 |
| 1061149 | 3/1967 | United Kingdom | 411/85 |

*Primary Examiner*—Neill R. Wilson

[57] ABSTRACT

A nut for accommodation in an open channel section (1) is comprised by a main body (6) provided with a threaded hole (7) and a gripping means (8) connected to the main body. The gripping means comprises a clamping device (9) for co-operation with the limiting edges (3, 4) of a longitudinal opening (2) in the channel section. During insertion of the nut in the channel section the gripping means is subjected to a torque about two generally orthogonal axes, and upon completed insertion the nut is held in the correct position by means of a form and/or friction locking co-operation between the limiting edges (3, 4) of the opening (2) and indentations (12, 13) in the legs of a U-shaped loop (9) constituting the clamping device.

7 Claims, 1 Drawing Sheet

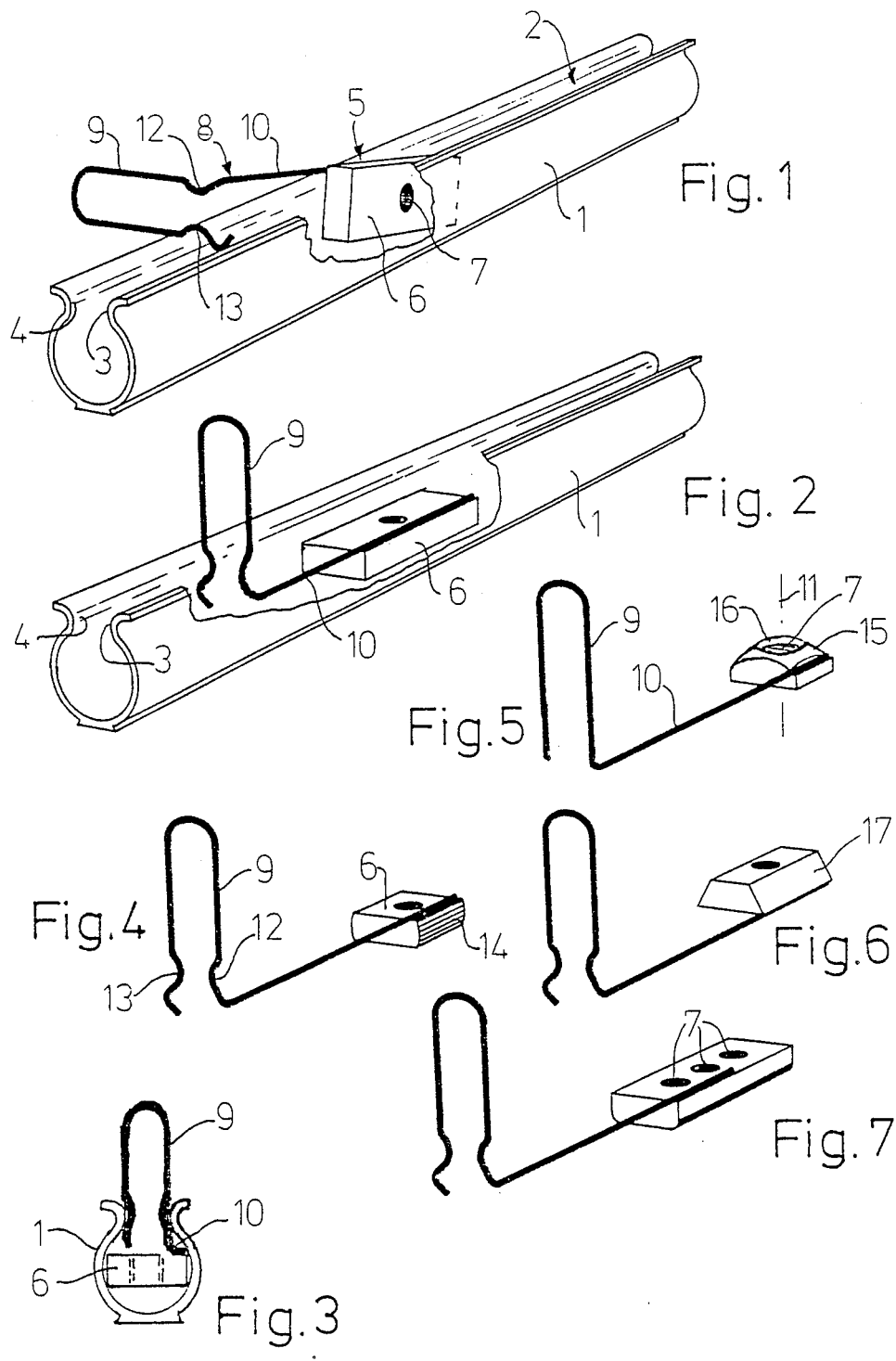

ARRANGEMENT RELATING TO A NUT FOR LOCATION IN AN OPEN CHANNEL SECTION

The present invention relates to an arrangement relating to a nut for location in an open channel section as recited in the preamble of claim 1.

Previously known nuts of this type are, before the screwing in of the bolt, binder or the like, held in the channel section by means of helical springs on the top or sides of the nut. Such nuts are difficult to remove from the channel section once they have been brought in place and, in addition, are difficult to displace in the channel section, for instance for adjustment to the desired bolt position. During poor lighting conditions, as the situation often will be when the channel section is used for ceiling attachment, it may be difficult to see the nut in the channel section, with difficulties resulting when the bolt or the like is to be screwed in place.

The object of the present invention is to provide an arrangement of said type, which does not suffer from the above deficiencies and drawbacks, and which at the same time is simple both to use and to manufacture.

This is obtained according to the invention by the arrangement being provided with the features recited in the characterizing clause of claim 1. Further advantageous features of the invention are recited in the dependent claims.

The design of the nut according to the invention with a gripping means permits very simple insertion of the nut in the channel section. The clamping device of the gripping means holds the nut in place, both before and while the bolt or the like is being screwed in. Furthermore, the clamping device permits relocation of the nut in the channel section in a simple manner without the use of tools or other aids and, besides, the clamping device will provide a feelable indication of the location of the nut during poor lighting conditions. Furthermore, the gripping means permits removing the nut from the channel section in case this should be desirable.

For better understanding of the invention it will be described more closely with reference to the exemplifying embodiments shown in the appended drawings.

FIG. 1 shows isometrically a portion of a channel section during the insertion of a nut according to the invention.

FIG. 2 shows the parts in FIG. 1 after the insertion of the nut.

FIG. 3 shows the parts in FIG. 2 seen in the direction of the channel section.

FIG. 4–7 show further embodiments of the nut according to the invention.

In FIG. 1 a portion of a channel section 1 is shown, having a generally circular cross section and a longitudinal opening 2 having limiting edges 3 and 4. The limiting edges are bent outwards in opposite directions so as to form longitudinal flanges. The further details of such a channel section and its advantageous fields of application are mentioned i.a. in U.S. Pat. No. 4,389,830, which is hereby incorporated as reference.

FIG. 1 further shows a nut 5 according to the invention, in this case comprising a rectangular main body 6 provided with a threaded hole 7 and a gripping means generally designated 8. The gripping means is comprised by a bent metal wire and has at its one end a clamping device 9, generally in the form of a U-shaped loop. One leg of the loop 9 is connected to the main body 6 of the nut by means of a portion 10 of the metal wire extending generally perpendicular to the axis 11 of the threaded hole 7 of the nut.

When the nut according to the invention is to be brought in place in the channel section 1, the loop or the clamping device 9 of the gripping means 8 is grasped and the main body 6 of the nut is introduced sideways through the opening 2 to the position shown in FIG. 1, the thickness of the main body being slightly less than the width of the opening 2. Next the loop 9 is subjected to a torque about an axis parallel to the axis 11 of the hole 7, so that the connecting portion 10 is bent resiliently and the main body 6 of the nut is pushed down to longitudinal contact with the bottom of the channel section. Thereupon the loop 9 is subjected to yet another torque, but this time with the connecting portion 10 as the axis, so that the main body 6 is rotated about 90° to the position shown in FIGS. 2 and 3. Concurrently, the legs of the loop 9 is clamped somewhat together so that they will fit between the limiting edges 3 and 4 of the opening. When the loop 9 is released, its legs will move resiliently outwards and come to frictional engagement with the limiting edges 3 and 4 of the channel opening.

From FIGS. 1–4, 6 and 7 it will be seen that the legs of the loop 9 are provided with indentations 12, 13 which generally fit the form of the limiting edges 3, 4. Thereby a form-locking effect is obtained permitting exact alignment between the main body 6 of the nut—and particularly its threaded hole 7—and the opening of the channel section in order to facilitate screwing a bolt or the like into the hole 7.

It will be seen that in the installed condition of the nut, the loop 9 extends somewhat out from the channel section. This extending part of the loop may be gripped and used to slide the nut in the channel section to the desired position upon its introduction into the channel. The loop may of course also be used to remove the nut from the channel section whenever desirable.

FIG. 4 shows an exemplifying embodiment of the nut according to the invention, where the main body 6 is provided with longitudinal serration 14 on the longitudinal edges. When a bolt or the like has been tightened in the nut, the serration will contribute to holding the nut in place even after loosening of the bolt.

In FIG. 5 a simplified embodiment of the gripping means 8 is shown, its U-shaped loop having straight legs without any indentations. This embodiment makes it simpler to twist the nut somewhat after its introduction into the channel section, which may be desirable if the bolt or the like to be fixed in the hole 7 cannot be introduced exactly at right angles into the channel section. FIG. 5 also shows an advantageous embodiment of the main body 6 of the nut. Its top surface 15 is curved in order to approximately fit the internal shape of the channel section in order to form firm engagement even when the bolt position is somewhat askew. Furthermore, the top surface of the nut has a conical portion 16 continuing into the threaded hole 7 of the nut, which also contributes to ease the introduction of a somewhat canted bolt.

In FIG. 6 an embodiment is shown where the main body of the nut has angled longitudinal edges 17 in order to provide a larger abutment surface with the inside of the channel section.

Finally, FIG. 7 shows an embodiment where the main body 6 of the nut is provided with three adjacent threaded holes 7. Such an embodiment is advantageous for applications where supporting brackets or the like, which are loaded in a direction parallel to the longitudinal direction of the channel section, are to be attached to the channel section.

The gripping means 8 itself may advantageously be made from resilient steel wire, for instance piano wire, which is spot welded to the main body of the nut.

Even though the invention has been described herein in the form of several advantageous exemplifying embodiments, the invention is in no way restricted to these, but may be varied and modified by the skilled person in a number of ways within the scope of the following claims.

I claim:

1. For use with an elongate channel section (1) forming an internal cavity and having limiting edges (3,4) defining a longitudinal opening (2); a bolt fixing assembly comprising, in combination:
   (a) a nut (5) having a main body (6) having a pair of elongate side walls and a threaded hole (7) therein, said hole defining an axis (11),
   (b) and gripping means (8) for manual insertion of said nut into a channel cavity,
   (c) said gripping means being constructed of a single bent metal wire and including a clamping device (9) for cooperation with the limiting edges of a channel opening,
   (d) said clamping device having a portion adapted to extend partially outside of a channel when said nut is positioned inside of a channel,
   (e) said clamping device including a single generally U-shaped elongate loop having a pair of legs at a free end thereof,
   (f) one of said legs being connected to said main body of said nut by means of a leg portion (10) which extends generally perpendicularly to said axis (11) and parallel to said elongate side walls.

2. The assembly according to claim 1, characterized in that said legs of said loop (9) are provided with indentations (12, 13) which are constructed to generally fit the limiting edges (3, 4) of an opening (2) of a channel section.

3. The assembly according to claim 1 or 2, characterized in that said gripping means (8) is constructed of piano wire which is spot welded to the main body (6) of said nut.

4. The assembly according to claim 1 or 2, characterized in that the main body (6) of said nut has a top surface (15) which is chamferred or curved in order to approximately fit the internal form of a channel section (1).

5. The assembly according to claim 4, characterized in that said top surface (15) has a conical portion (16) extending into said threaded hole (7).

6. The assembly according to claim 4, characterized in that the main body (6) of said nut has a plurality of adjacent threaded holes (7).

7. The bolt fixing assembly of claim 1 or 2 wherein said elongate side walls of said nut (5) are adapted to be longer than the largest transverse dimension of a channel internal cavity.

* * * * *